United States Patent [19]

Rehklau

[11] 4,387,843

[45] Jun. 14, 1983

[54] LOOP BIN FOR MAGNETIC TAPE RECORDING APPARATUS

[75] Inventor: George D. Rehklau, Los Altos, Calif.

[73] Assignee: Electro-Sound Inc., Sunnyvale, Calif.

[21] Appl. No.: 146,295

[22] Filed: May 5, 1980

[51] Int. Cl.³ .................. B65H 17/42; G11B 15/56
[52] U.S. Cl. ................................ 226/118; 242/182
[58] Field of Search ............... 226/118, 119, 113, 26; 242/182–185, 76; 317/2; 360/93, 132, 71

[56] References Cited

U.S. PATENT DOCUMENTS

| | | | |
|---|---|---|---|
| 2,542,506 | 2/1951 | Gibson | 360/71 |
| 2,889,491 | 6/1959 | MacDonald | 317/2 |
| 2,908,767 | 10/1959 | Fritzinger | 226/118 X |
| 3,048,315 | 8/1962 | Pankratz et al. | 226/118 |
| 3,169,686 | 2/1965 | Rabinow | 226/26 |
| 3,201,525 | 8/1965 | Boyden | 226/118 X |
| 3,340,369 | 9/1967 | Seidl | 360/93 |
| 3,493,948 | 2/1970 | Ironside et al. | 340/174.1 |
| 3,507,433 | 4/1970 | Davidow | 226/113 |

*Primary Examiner*—Leonard D. Christian
*Attorney, Agent, or Firm*—Claude A. S. Hamrick

[57] ABSTRACT

A loop bin for use with tape transport apparatus including a front wall 50 and rear wall 52 separated by slightly more than the width of the tape to be stored, a pair of entry and exit openings at the top, a resilient distributing arm 34 located proximate the entry opening a compliant length of flexible material 36 suspended from each side of the bin and forming a catenary configured bin bottom, and a compliant damper loop 38 disposed midway down the bin and adjacent the exit side thereof for damping exiting tape tension fluctuations and assisting in the stacking of tape within the bin.

10 Claims, 2 Drawing Figures

U.S. Patent   Jun. 14, 1983   4,387,843
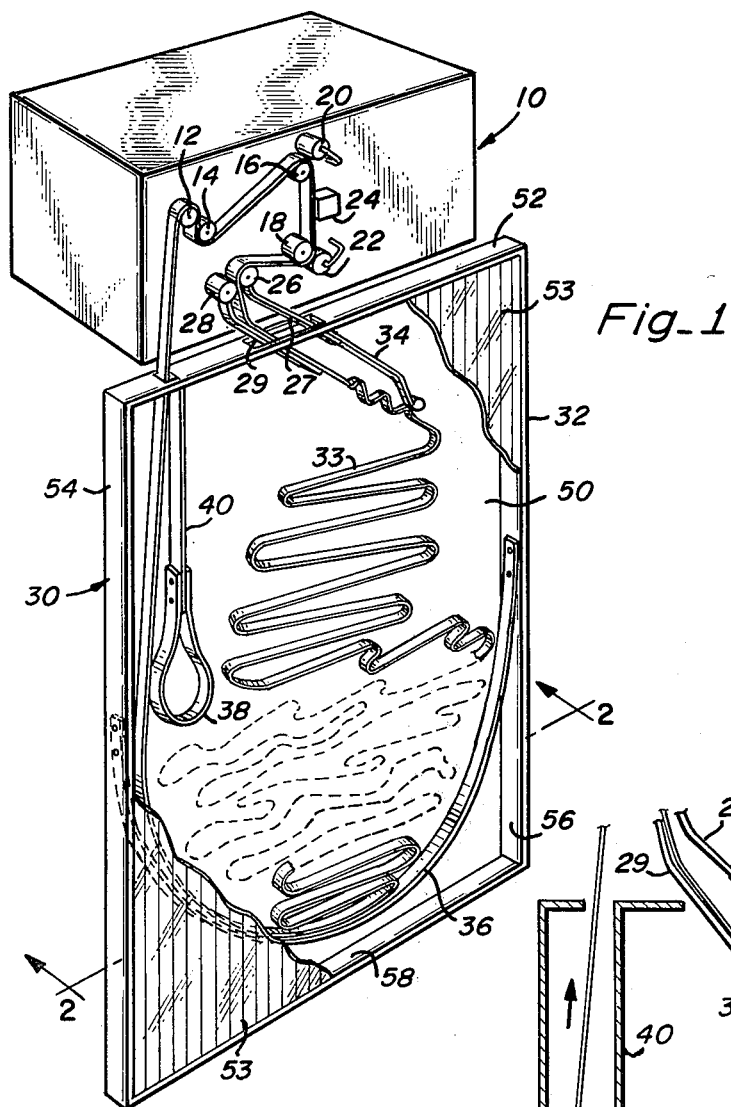
Fig_1
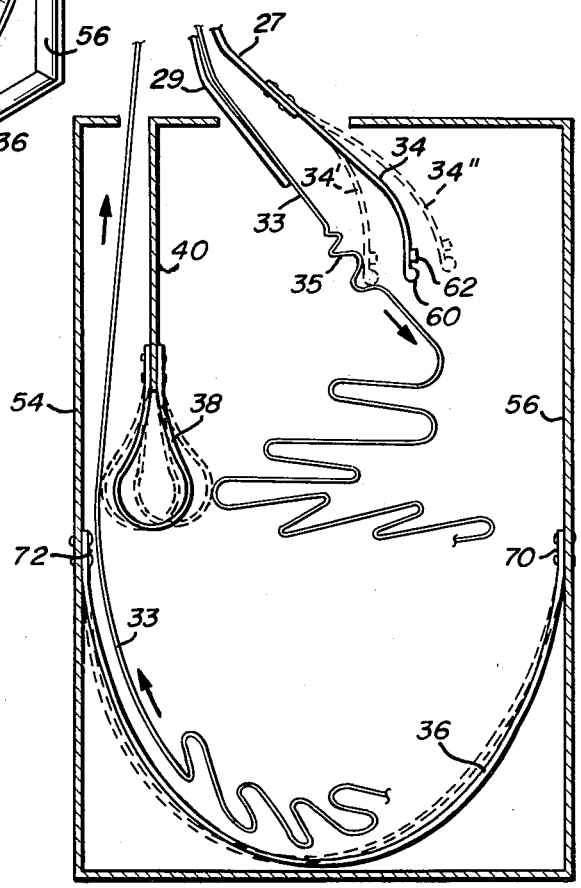
Fig_2

LOOP BIN FOR MAGNETIC TAPE RECORDING APPARATUS

BACKGROUND OF THE INVENTION

1. Field of the Invention

The present invention relates generally to magnetic tape recording apparatus and more particularly to storage bins for storing an endless loop of magnetic recording tape which is folded back and forth in serpentine configuration.

2. Description of the Prior Art

In high speed magnetic tape duplicating and recording systems as well as in data processing equipment utilizing magnetic tape, it is now common practice to utilize loop storage bins in which a long length of tape is folded back and forth in serpentine fashion in a generally rectangular shaped storage bin having front and back walls which are separated only slightly more than the width of the tape to be stored. In such apparatus, the tape is normally loaded from the top and caused to loop back and forth upon itself as the other end is withdrawn from the bottom of the loop pile. The tape's own weight is used to compact the serpentine loops within the bin. Prior art U.S. Pat. Nos., which may be of interest by way of general background, are Gibson 2,542,506, MacDonald 2,889,491, Fritzinger 2,908,767 and Boyden 3,201,525.

One of the problems associated with prior art loop bin constructions has been overcoming the friction between the bottom surface of the bin and the portions of the tape being withdrawn from the bottom of the loop pack. One prior art attempt to overcome this problem has been to use a plurality of closely spaced rollers to form the bottom and partial side portions of the bin. Another solution has been to utilize a plurality of short, belt conveyers such as is shown in the U.S. Pat. No. 4,000,516 of Kazuo Watanabe et al. However, such solutions are mechanically complex and quite expensive in that the rollers are conveyers must be provided with expensive low friction bearings and smoothly polished surfaces.

Another prior art problem is associated with the perturbations in speed of the portion of the tape being withdrawn from the bottom of the stack due to differing frictional forces on various portions of the folded loops at the bottom of the bin. The primary prior art solution to the problem has been to utilize a heavy flywheel controlled damping roller in the tape transport mechanism. Although such means are successful in reducing tape speed fluctuations at the recording or playback head with a measure of success, there is definitely room for improvement.

Still another problem with prior art storage bin designs relates to the ability of the device to store a large quantity of folded tape within a particular bin volume. It has been found that the amount of tape which can be stored in a particular bin volume is directly related to the manner in which the tape is folded within the bin, i.e., it appears that the more folds there are, the larger the quantity of tape that can be stored within a given volume and the more mobile the tape is at the bottom of the stack.

SUMMARY OF THE PRESENT INVENTION

A primary objective of the present invention is to provide a tape storage bin for tape transport apparatus and the like which is simple in construction and inexpensive to manufacture.

Another objective of the present invention is to provide a loop bin for tape transports and the like which enables a large quantity of tape to be stored within a particular bin volume.

Another objective of the present invention is to provide a loop bin for tape transport apparatus and the like having means for aiding the removal of the tape from the bin bottom and for assisting in the damping of perturbations in the tension of the tape portion being withdrawn from the bin.

Still another objective of the present invention is to provide a loop bin for tape transport apparatus and the like having means for improving the distribution and compaction of tape within the bin.

In accordance with a presently preferred embodiment of the present invention, a loop bin is provided which includes a front and rear wall separated slightly more than the width of the tape to be stored, entry and exit openings at the top, a resilient distributing arm located proximate the entry opening, a compliant length of flexible material suspended from each side of the bin and forming a cantenary configured bin bottom, and a compliant damper loop disposed midway down the bin and adjacent the exit side thereof for damping exiting tape tension fluctuations and assisting in the stacking of tape within the bin.

An important advantage of the present invention is that it utilizes inexpensive materials, is simple is construction and is highly effective in operation.

Another advantage of the present invention is that it enables tape to be packed more densely into the same bin volume as compared to prior art devices.

These and other objects and advantages of the present invention will no doubt become apparent to those of ordinary skill in the art after having read the following detailed disclosure of a preferred embodiment.

IN THE DRAWING

FIG. 1 is a partially broken perspective view schematically illustrating a tape transport and loop bin in accordance with the present invention; and FIG. 2 is a cross-sectional view of the bin taken along the line 2—2 of FIG. 1 to more clearly illustrate the various components thereof.

DETAILED DESCRIPTION OF THE PREFERRED EMBODIMENT

Referring now to FIG. 1 of the drawing, there is shown at 10 a representation of a tape transport apparatus including a guide roller 12, a flywheel damping roller 14, a pair of drive capstans 16 and 18, a pair of pinch rollers 20 and 22, a record/playback head 24 and a pair of exit guide rollers 26 and 28. Also carried by the transport housing are a pair of guide straps 27 and 29. Disposed in front of and beneath the transport 10 is a loop storage bin 30 in accordance with the present invention and including a rectangular body 32 forming an internal chamber for receiving a loop of tape 33, a distributor arm 34, a compliant bottom strap 36 and a damper mechanism 38. The entry aperture for the bin is defined by the guide strips 27 and 29 and the exit aperture is defined by a partition 40 which extends from the top of the bin downwardly for about one third the vertical length thereof.

Body 32 is comprised of a pair of planar sheets of smooth surfaced material such as metal, glass or plastic and which form the front and rear walls 50 and 52 respectively of the bin. In the preferred embodiment, the rear wall 52 is made of an aluminum sheet and the front wall 50 is made of a transparent glass sheet which permits observation of the loop stack during operation. In order to discharge the static electric charge which accumulates on the tape, strips of conductive ribbon 53 are adhesively affixed to the inside surface of wall 50 and grounded to the unit chassis at top and bottom. The front and rear walls are separated by a distance slightly wider than the width of the tape to be stored and are affixed together by means of side walls 54 and 56, bottom wall 58 and the partition 40.

Referring now additionally to FIG. 2, the distributor arm 34 is comprised of a bowed length of flexible metal or plastic which is affixed at one end to the guide member 27 by means of suitable fastening means and has its distal end rolled back upon itself as illustrated at 60. In addition, an adjustable weight 62 is affixed to a portion of the distal end of the distributor arm.

In the preferred embodiment, the arm 34 is compised of a 10 inch length of 0.005 inch thick SST shim stock and has a width of ½ inch. Arm 34 is designed so as to resiliently engage the tape in oscillatory fashion at a frequency determined by its own resonance characteristics. It is free to fall to a tape engaging position shown by the dashed lines 34', bounce therefrom into an upper position shown by the dashed lines 34'', and then return to the tape engaging position. Each time the arm strikes the tape 33 which is being fed into the bin at high speed, typically 240 inches per sec., it causes a wave action to be set up therein as illustrated at 35 which causes the moving tape to distribute itself rather short folds as it falls into the bin.

The bottom strap 36 in the preferred embodiment is comprised of a length of 0.005 thick shim stock, one end 70 of which is affixed to wall 56, and then other end 72 of which is affixed to wall 54. The strap is freely hung within the bin chamber and is allowed to assume a cantenary configuration. Because it is a compliant length of material which is free swinging, it will move and deform slightly as the tape 33 is drawn from the bottom of the stack, and the motion and deformations thereof will aid both the packing of the loop and the removal of the tape from the bottom of the stack.

Damper member 38 is also comprised of a length of 0.005 thick shim stock having both ends affixed to the lower end of the partition 40 and serves to provide a means for drawing lateral motion of tape 33 as its tension increases and decreases during its withdrawal from the bottom of the bin. In addition, since the tape stack extends above its lower extremity, the movement of damper member 38 also tends to aid in compacting the tape within the bin.

In operation, the loop is initially deposited within the bin and is threaded through the various guide rollers and capstans of the transport 10. Arm 34 is then lifted and the transport is energized to begin motion of the tape. As the tape accelerates into the bin, it will follow the upper surface of guide 28 and enter bin 30 in a straight line and form rather large loops as it folds into the bin. Arm 34 is then released and allowed to strike the incoming tape as illustrated. Upon striking the tape, arm 34 will be driven upwardly and as a result of the strike, a wave action will be induced in the tape as depicted. The net result of the wave action is that it causes the tape to fold back upon itself in short loops instead of the longer loops which would otherwise occur. Arm 34 then returns and strikes the tape again and again at a rate determined by its stiffness and the mass of the weight 62 affixed to its distal end. It has been found that a weight of approximately 2.5 grams causes an arm of the type described to oscillate at about 180 swings per minute and to create tape loops of approximately four inches between folds.

By operating the device with arm 34 held out of engagement with the tape and allowing the bin to be fully filled with free formed loops, the stack will assume a particular stack heighth within the bin. However, by releasing the arm 34 and allowing it to perform its function, the stack heighth will be reduced by approximately 25% indicating a substantial compaction of the stack as a result of the action of arm 34.

The vibratory distortion and motion of strap 36 and member 38 can also be readily observed during operation of the device and a substantial improvement in damping of tape speed perturbations at the output of the damping roller 14 can be observed.

Although a single preferred embodiment of the present invention has been disclosed herein, it will be appreciated that various alterations and modifications of the various components will become apparent to those skilled in the art after having read this disclosure. For example, the configuration of arm 34 and damper member 34 might be modified somewhat for ease of manufacture or other reasons while still performing the same function. Moreover, the length of strap 36 may be increased or decreased to achieve optimum operation for a particular weight of tape. It is therefore intended that the appended claims be interpreted as covering all such alterations and modifications as fall within the true spirit and scope of the invention.

What is claimed is:

1. A loop storage bin for tape transport apparatus and through which a continuous loop of magnetic recording tape or the like may be continuously input and withdrawn, comprising:
    means forming a generally rectangular body having front and rear walls disposed in parallel spaced apart relationship, said front and rear walls being spaced apart a distance slightly larger than the width of the tape to be stored therein;
    means defining a tape entry opening at the top of said body for receiving incoming tape;
    distributor means disposed proximate said opening and including a flexible arm, the distal end of which is caused to periodically engage a surface of said incoming tape so as to create waves therein;
    means forming a compliant bottom surface for said bin and upon which said incoming tape is caused to stack; and
    resilient shock absorbing means disposed within said bin on one side thereof and defining an exit passageway for said tape, said resilient means being engageable by said tape as it is withdrawn from the bottom of the stack and operative to damp lateral motion of said tape as it is withdrawn.

2. A loop storage bin for tape transport apparatus as recited in claim 1 wherein said distributor arm is comprised of a length of flexible material, one end of which is rigidly affixed relative to said body and the other end is disposed in cantilever fashion so as to extend into the path taken by said tape in entering said bin, said arm being free to oscillate into and out of engagement with said tape so as to create said waves therein.

3. A loop storage bin for tape transport apparatus as recited in claims 1 or 2 wherein said compliant bottom surface is formed of a length of flexible material disposed between said front and rear walls and having one end affixed to one side of said body and other end affixed to the other side of said body and its mid-portion suspended in catenary fashion therebetween, the width of said strap being slightly less than the separation between said front and back walls.

4. A loop storage bin for tape transport apparatus as recited in claim 1 wherein said damping member includes a folded length of flexible material having its ends attached together and to said housing with its folded portion extending downwardly so as to engage the stack of tape on one side and the exiting length of tape on its other side.

5. A loop storage bin for tape transport apparatus as recited in claim 3 wherein said damping member includes a folded length of flexible material having its ends attached together and to said housing with its folded portion extending downwardly so as to engage the stack of tape on one side and the exiting length of tape on its other side.

6. A loop storage bin for tape transport apparatus and through which a continuous loop of magnetic recording tape or the like may be continuously input and withdrawn, comprising:
   means forming a generally rectangular body having front and rear walls disposed in parallel spaced apart relationship, said front and rear walls being spaced apart a distance slightly larger than the width of the tape to be stored therein;
   means defining a tape entry opening at the top of said body for receiving incoming tape;
   means defining a tape exit passageway through which tape contained within said body may be withdrawn;
   means attached to said body and forming a compliant bottom surface for said bin and upon which said incoming tape is caused to stack; and
   distributor means disposed proximate said opening and including a flexible arm, the distal end of which is caused to periodically engage a surface of said incoming tape so as to create waves therein which cause said tape to stack within said bin in fold lengths substantially shorter than the width of said bin.

7. A loop storage bin for tape transport apparatus as recited in claim 6 and further comprising:
   resilient shock absorbing means disposed within said bin on one side thereof proximate said exit passageway, said resilient means being engageable by said tape as it is withdrawn from the bottom of the stack and operative to damp lateral motion of said tape as it is withdrawn.

8. A loop storage bin for tape transport apparatus as recited in claim 7 wherein said distributor arm is comprised of a length of flexible material, one end of which is rigidly affixed relative to said body and the other end is disposed in cantilever fashion so as to extend into the path taken by said tape in entering said bin, said arm being free to oscillate into and out of engagement with said tape so as to create said waves therein.

9. A loop storage bin for tape transport apparatus as recited in claim 8 wherein said compliant bottom surface is formed of a length of flexible material disposed between said front and rear walls and having one end affixed to one side of said body and another end affixed to the other side of said body and its mid-portion suspended in catenary fashion therebetween, the width of said strap being slightly less than the separation between said front and rear walls.

10. A loop storage bin for tape transport apparatus as recited in claim 9 wherein said damping member includes a folded length of flexible material having its ends attached together and to said housing with its folded portion extending downwardly so as to engage the stack of tape on one side and the exiting length of tape on its other side.

* * * * *